United States Patent [19]

Langford et al.

[11] Patent Number: 4,825,966
[45] Date of Patent: May 2, 1989

[54] WEIGH SCALE WITH DIGITAL AND DISCRETE FRACTIONAL WEIGHT INDICATORS

[75] Inventors: Stephen R. Langford, Joplin, Mo.; Herbert H. Pollinger, Columbus, Kans.

[73] Assignee: Cardinal Scale Manufacturing Company, Webb City, Mo.

[21] Appl. No.: 156,356

[22] Filed: Jan. 12, 1988

[51] Int. Cl.⁴ .................. G01G 23/30; G01D 13/22
[52] U.S. Cl. ................. 177/177; 177/DIG. 3; 116/300; 116/DIG. 32
[58] Field of Search ............ 177/177, 178, DIG. 3; 116/300, DIG. 32

[56] References Cited

U.S. PATENT DOCUMENTS

| 3,189,111 | 6/1965 | Ast | 177/178 |
| 3,550,703 | 12/1970 | Knothe et al. | 177/178 X |
| 4,076,088 | 2/1978 | Gallo et al. | 177/177 |
| 4,542,799 | 9/1985 | Komoto | 177/177 |
| 4,650,014 | 3/1987 | Oldendorf et al. | 177/177 |
| 4,656,600 | 4/1987 | Swann | 177/177 X |

OTHER PUBLICATIONS

Noritake Co., Ltd., Itron Phosphorescent Displays (an advertisement).

Primary Examiner—George H. Miller, Jr.
Attorney, Agent, or Firm—Hovey, Williams, Timmons & Collins

[57] ABSTRACT

A weigh scale having a unique display is provided which allows rapid, accurate, and convenient determination of the weight of an object to the nearest discrete fractional portion of a weight unit. The preferred weight unit includes a digital display for the object in whole ounces and four light-emitting indicators, one of which illuminates to indicate the object's fractional weight to the nearest quarter-ounce.

6 Claims, 5 Drawing Sheets

WEIGH SCALE WITH DIGITAL AND DISCRETE FRACTIONAL WEIGHT INDICATORS

BACKGROUND OF THE INVENTION

1. Field of the Invention

This invention relates to a weigh scale having a digital display for whole number increments of a weight unit and discrete indicators for fractional portions of the weight unit. More particularly, the invention relates to a weigh scale having light-emitting fractional weight indicators which are illuminated to indicate the nearest fractional weight unit of an object being weighed by the scale.

2. Description of the Prior Art

In fast-food restaurants, pizza restaurants, and the like quality and cost control require that food ingredients be weighed precisely and quickly. To accomplish this, prior art weigh scales, usually calibrated in ounces, provide a digital indication including decimal fractions of the weight of the ingredient on the scale.

Control specifications may require that ingredients be weighed to the nearest quarter-ounce, for example, and with a digital weigh scale speed must be sacrificed, at least in part, for accuracy. For example, if specifications call for an ingredient to weigh 12.75 ounces to the nearest quarter-ounce, the operator must stop and mentally calculate, whether 12.87 ounces is closer to 12.75 or 13.00 ounces. While practice increases the speed of such mental calculations, fast food restaurants and the like typically have a high turnover in personnel and have a shortage of experienced people. As a result, the weighing process for ingredients tends to slow down while the scale operator repetitively weighs ingredients to the nearest quarter-ounce, or, alternatively accuracy suffers, and thus so does quality and cost control, in order to gain speed when demand increases.

SUMMARY OF THE INVENTION

The weigh scale in accordance with the present invention solves the problems as outlined above. Specifically, the present invention allows rapid weighing of ingredients to the nearest fractional weight unit without sacrificing speed or accuracy.

The preferred weigh scale includes a signal processor, such as an integrated microcomputer, and a display operably coupled therewith for providing a digital display for whole number weight units and fractional indicators for indicating discrete fractional portions of the weight unit. More particularly, the weigh scale includes a platform for supporting the object to be weighed and a load cell operably coupled thereto and additional circuitry for producing a scale signal for input to the signal processor representative of the weight of the object.

In the preferred embodiment, the output signal of the microcomputer is in the form of an 8-bit binary byte (or bytes) in which the two least significant bits represent the fractional weight of the object and the remaining bits represent a whole number multiple of the weight unit. The two least significant bits allow for four discrete fractional representations such as 0, ¼, ½, and ¾ corresponding to decimal 0, 1, 2, and 3. An appropriate fractional indicator, such as the preferred light-emitting diode, is then illuminated corresponding to the binary count of the two least significant bits. The remaining bits activate the digital display, preferably a liquid crystal digital display, in order to indicate the nearest inclusive whole number weight unit multiple, preferably in ounces, of the object weight.

BRIEF DESCRIPTION OF THE DRAWING FIGURES

DESCRIPTION OF THE PREFERRED EMBODIMENT

Figure 1:
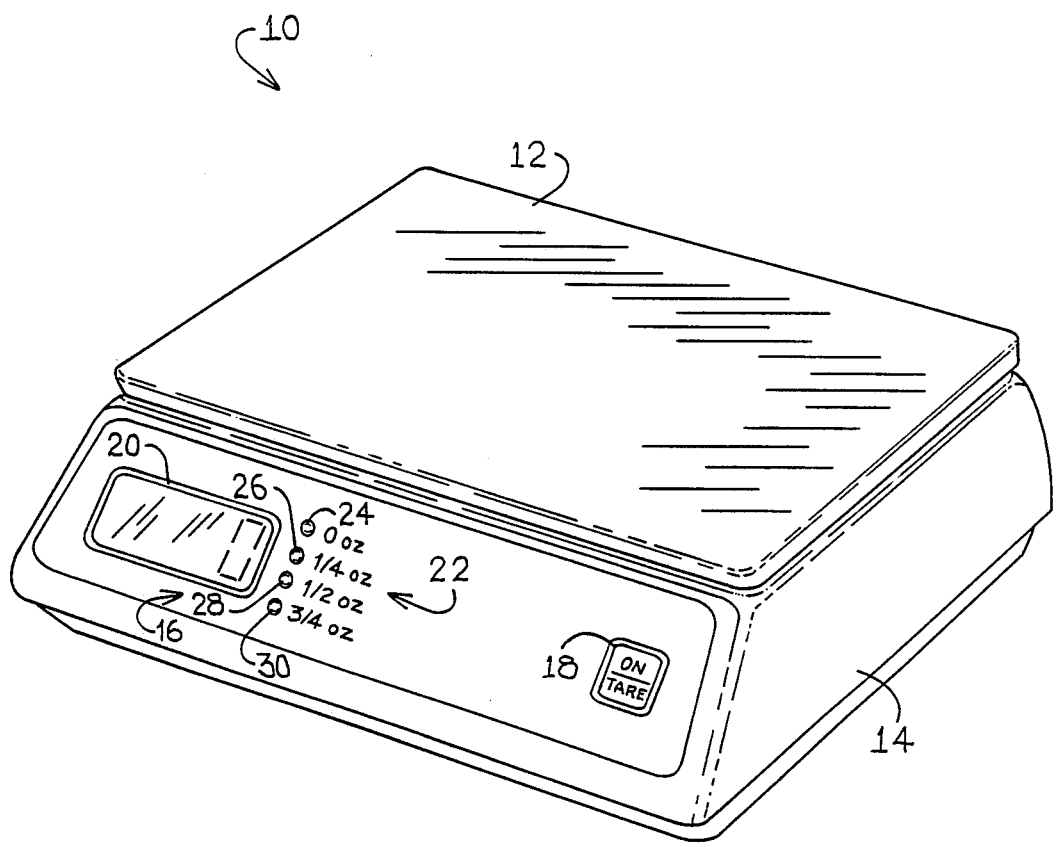
FIG. 1 is a perspective view of the preferred weigh scale.

Referring now to the drawing figures, weigh scale 10 (FIG. 1) broadly includes platform 12, housing 14, weight display 16, and normally open, ON/TARE, membrane switch 18.

Platform 12 and housing 14 are conventional in nature and preferably incorporate santitary design for use in a food environment.

Weight display 16 includes digital weight display 20 for indicating a whole number multiple (which may be zero) of a weight unit, preferably in ounces, of the weight of the object to be weighed on platform 12. Display 16 further includes fractional weight display indicators 24, 26, 28, and 30 preferably comprised of respective light emitting diodes (LED) which correspond respectively to predetermined discrete fraction weight portions of the weight unit, preferably in quarter-ounce increments corresponding to 0, ¼, ½ and ¾ ounces.

Housing 14 encloses electronic section 32 which electronically intercouples platform 12 with display 16 and switch 18. Electronic section 32 includes load cell section 34, analog section 36, and 8-bit microcomputer 38 (preferably type M50743-XXXSP).

Electronic section 32 also includes conventional oscillator section 40 including a conventional crystal and other components (not shown) operably coupled with microcomputer 38 in order to generate a time base at 8 megahertz. Electronic section 32 also includes conventional power supply 42 having a replaceable battery (not shown) operably coupled with microcomputer 38 for providing power at +5 V.D.C.

Figure 2:
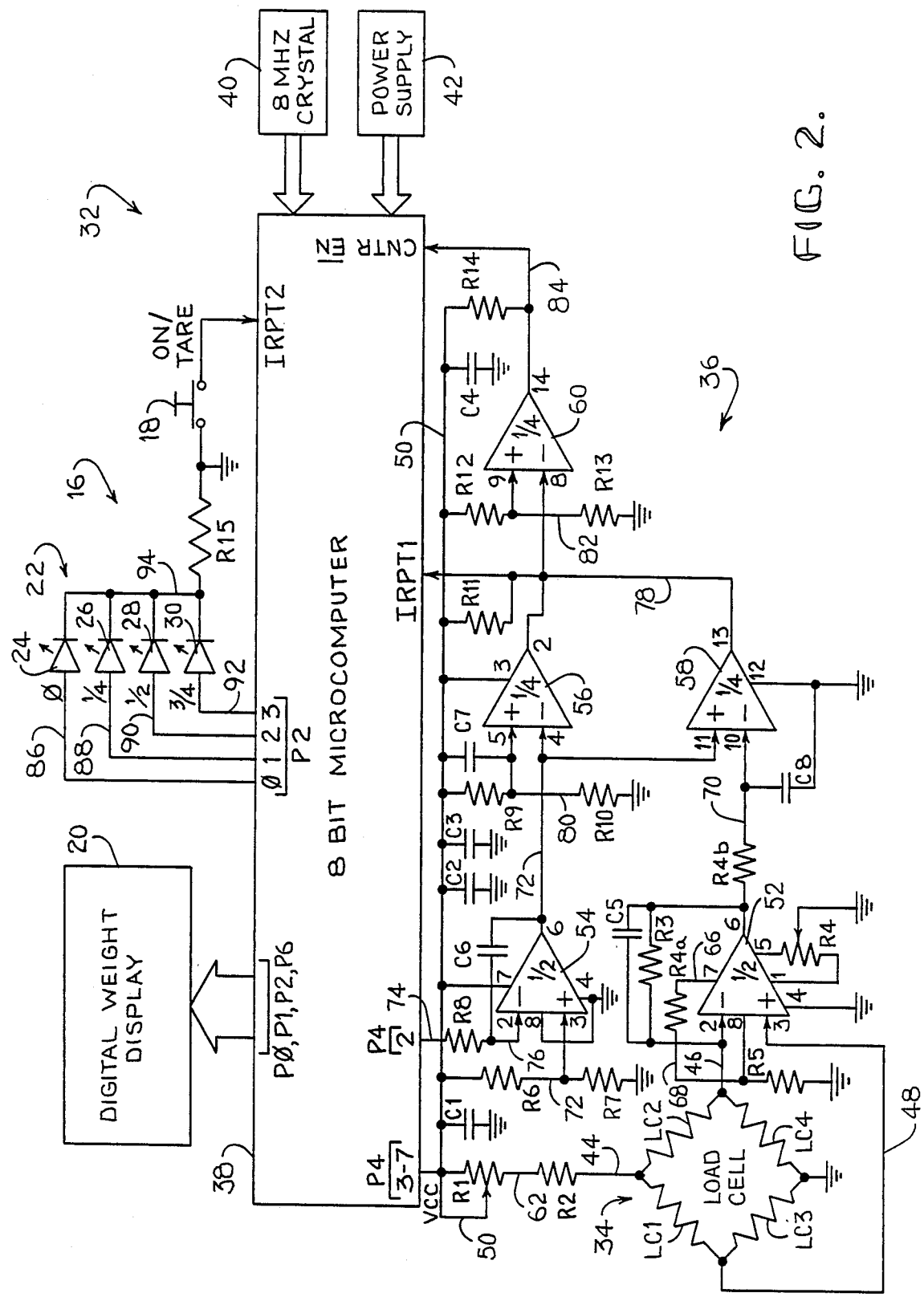
FIG. 2 is an electrical schematic of the preferred components of the weigh scale.

Load cell section 34 is a conventional load cell arrangement operably coupled with platform 12 and includes four load cell segments LC1, LC2, LC3, and LC4 arranged as a conventional bridge and interconnected as shown in FIG. 2 with each segment presenting a nominal resistance of 1,000 ohms. Load cell section 34 is designed to present an output of 2 millivolts per volt of exitation at the load cell's rated capacity. Load cell section 34 receives exitation voltage at the juncture between segments LC1 and LC2 via line 44; the juncture between segments LC3 and LC4 is grounded as shown. Additionally, load cell section 34 provides an output via lines 46 and 48 from the respective junctures of segments LC2 and LC4 and segments LC1 and LC3.

Analog section 36 is designed as a voltage-to-frequency converter and receives the analog voltage output from load cell section 34 via lines 46 and 48 in order to convert that analog voltage to a digital frequency output as will be explained further hereinbelow.

Analog section 36 includes supply line 50 ($V_{cc}$), load cell signal amplifier 52, integrator 54, reference-integrator comparator 56, load cell-integrator comparator 58, and inverter 60. In the discussion hereinbelow, the preferred values of the various components are indicated when each component is first mentioned.

Supply line 50 receives supply voltage at a nominal +5 V.D.C. from microcomputer 38 at output ports 3-7 of section P4. Various capacitors with one side grounded are coupled with line 50 as shown and include capacitor C1 (10 microfarads ($\mu f$)) and capacitors C2, C3, and C4 (0.1 $\mu f$ each).

Supply line 50 supplies exitation voltage to load cell section 34 via variable resistor R1 (1K ohms span), line 62, and resistor R2 (402 ohms), and line 44 as shown. Variable resistor R1 adjusts the exitation voltage as needed.

Load cell signal amplifier 52 ($\frac{1}{2}$ of type TLC271CP) receives a negative terminal input signal via line 46 (pin 2) and a positive terminal input signal via line 48 (pin 3) from load cell section 34. Resistor R3 (150K ohms) and capacitor C5 (0.018 $\mu f$) in parallel interconnect the output of amplifier 52 (pin 6) via line 64 to the negative terminal input via line 46 (pin 2) to set the gain of amplifier 52 at approximately 150. Potentiometer R4 (25 K ohms) interconnects pins 1 and 5 and is adjustable to ground as shown in order to adjust the offset of amplifier 52. Pin 4 is grounded as shown. A voltage divider network composed of line 66, resistor R4, line 68 and resistor R5 connected to ground as shown provides feedback via line 68 to pin 8. Amplifier 52 with a gain of 150 provides an output via line 70 between 0.5 and 2.0 volts corresponding to a preferred weight span of 0 to 70 ounces on platform 12.

Integrator 54 ($\frac{1}{2}$ of type TLC271CP) provides a contant-slope ramp output on line 72 which either ramps up if the input at pin 2 is low (0 V.D.C.), or ramps down if pin 2 input is high (+5 V.D.C.), the purpose of which is explained hereinbelow. Integrator 54 receives a positive terminal input (pin 3) by way of a voltage divider including resistor R6 (49.9K ohms) one side of which is connected to line 50, line 72 which is also connected to pin 3 of integrator 54, and resistor R7 (49.9K ohms) the other side of which is grounded as shown. Because of the voltage divider network, positive input voltage at pin 3 is approximately +2.5 V.D.C. (with line 50 at +5 V.D.C.). Line 50 is also connected to pin 7 of integrator 54.

Negative terminal input (pin 2) to integrator 54 is provided under software control at output terminal 2 (section P4) of microcomputer 38 via line 74, resistor R8 (60.4K ohms) and line 76. The slope of the output ramp (see FIG. 5) is determined by capacitor C6 (0.33 $\mu f$) which interconnects line 72 (pin 6) and line 76 (pin 2). Pins 4 and 8 are grounded as shown.

Under software control via output terminal P4-2 from microcomputer 38, the output from integrator 54 via line 72 ramps upwardly at a constant slope when input to pin 2 is low. Conversely, the output via line 72 ramps downwardly when the input to pin 2 is high at +5 V.D.C. which exceeds the reference voltage input (+2.5 V.D.C.) at pin 3.

Comparators 56 and 58 (one-fourth of type CA339E) provide outputs on line 78 via pins 2 and 13 respectively. These two comparators cooperate such that the output on line 78 goes low (0 V.D.C.) whenever the integrator ramp voltage falls below load cell amplifier voltage, and also goes low whenever the integrator output voltage exceeds a reference voltage supplied to comparator 56.

Comparator 56 receives its reference input voltage by way of a voltage divider including resistor R9 (24.9K ohms) one side of which is connected to line 50, line 80 which is connected to the positive input terminal (pin 5 of comparator 56), and resistor R10 (49.9K ohms) the other side of which is connected to ground as shown. The voltage divider network with line 50 at +5 V.D.C. provides a reference voltage at about +3.3 V.D.C. at the positive input terminal (pin 5) of comparator 56. The negative terminal input thereof is provided at pin 4 via line 72 from integrator 54. Line 50 is connected at pin 3 of comparator 56 and capacitor C7 (0.01 $\mu f$) intercouples line 50 with line 80. Whenever the voltage at pin 4 (ramp voltage from integrator 54) exceeds the reference voltage (+3.3 V.D.C) at pin 5, the output of comparator 56 on line 78 sinks current and goes low.

Comparator 58 receives its negative terminal input (pin 10) via line 70 and resistor R4b (24.9K ohms) interposed in series therewith and which is the amplified load cell voltage from amplifier 52. Positive terminal input (pin 11) is received via line 72 from integrator 54. Pin 12 of comparator 58 is connected to ground as shown and capacitor C8 (0.01 $\mu f$) intercouples line 70 (pin 10) of comparator 58 with ground as shown.

Comparator 58 output on line 78 (pin 13) is high as long as the ramp voltage received via line 72 exceeds the load cell amplifier 52 output voltage received via line 70. When the voltage on line 72 drops below that on line 70, comparator 58 output (pin 13) sinks current and line 78 goes low. As will be explained further hereinbelow, the ramp voltage is then reversed and begins to climb immediately thereafter so that the positive terminal input voltage to comparator 58 exceeds the negative terminal input voltage via line 70, and line 78 again goes high.

Line 78 is connected to interrupt terminal IRPT 1 of microcomputer 38 as shown. Additionally, pull-up resistor R11 (47K ohms) interconnects line 50 with line 78.

Line 78 is also connected as the negative terminal input (pin 8) to inverter 60. Inverter 60 receives its positive input terminal input (pin 9) by way of a voltage divider network composed of resistor R12 (47K ohms), one side of which is connected to line 50, line 82 which is also connected to pin 9, and resistor R13 (47K ohms) the other side of which is connected to ground as shown. The voltage divider network composed of resistors R12 and R13 provides a reference voltage at +2.5 V.D.C. to inverter 60. Inverter 60 provides an output via line 84 (pin 14) to counter enable terminal CNTR $\overline{EN}$. Pull-up resistor R14 (47K ohms) interconnects line 50 with line 84. Whenever the negative terminal input via line 78 to inverter 60 is high (+5 V.D.C.), the output from inverter 60 is low via line 84 and viceversa. As will be explained further hereinbelow, whenever the voltage on line 84 is low, an internal counter in microcomputer 38 is enabled.

Digital weight display 20 is a conventional, 7-segment, liquid crystal display providing two digit indication of the weight of an object on platform 12, preferably in ounces. Output signals to operate digital weight display 20 are provided by microcomputer 38 via output sections P0 (terminals 0-7), P1 (terminals 0-7), P2 (terminals 4-7), and P6 (terminals 0-7).

Fractional weight display 22 receives four inputs respectively from each indicator 24-30 to the anode of each via lines 86, 88, 90, 92 respectively which are provided by microcomputer 38 at output section P2 (terminals 0-3 respectively). The cathodes of indicators 24-30 are connected, as shown, via line 94 and to ground via resistor R15 (1K ohms) the other side of which is grounded.

On/tare switch 18 interconnects interrupt terminal IRPT 2 with ground as shown.

Figure 3:
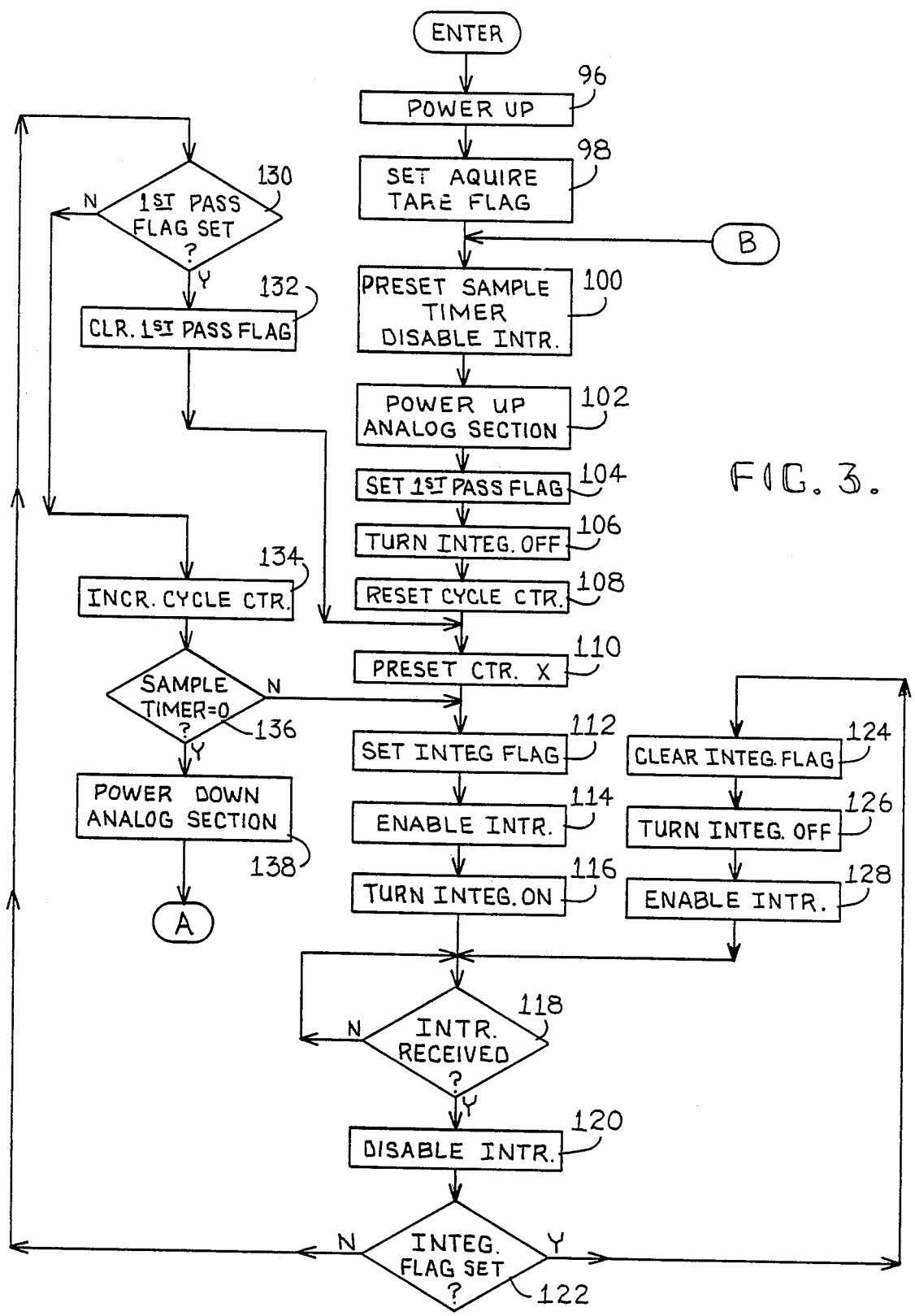
FIG. 3 is a computer program flowchart illustrating the first portion of the operating program for the weigh scale.
Figure 4:
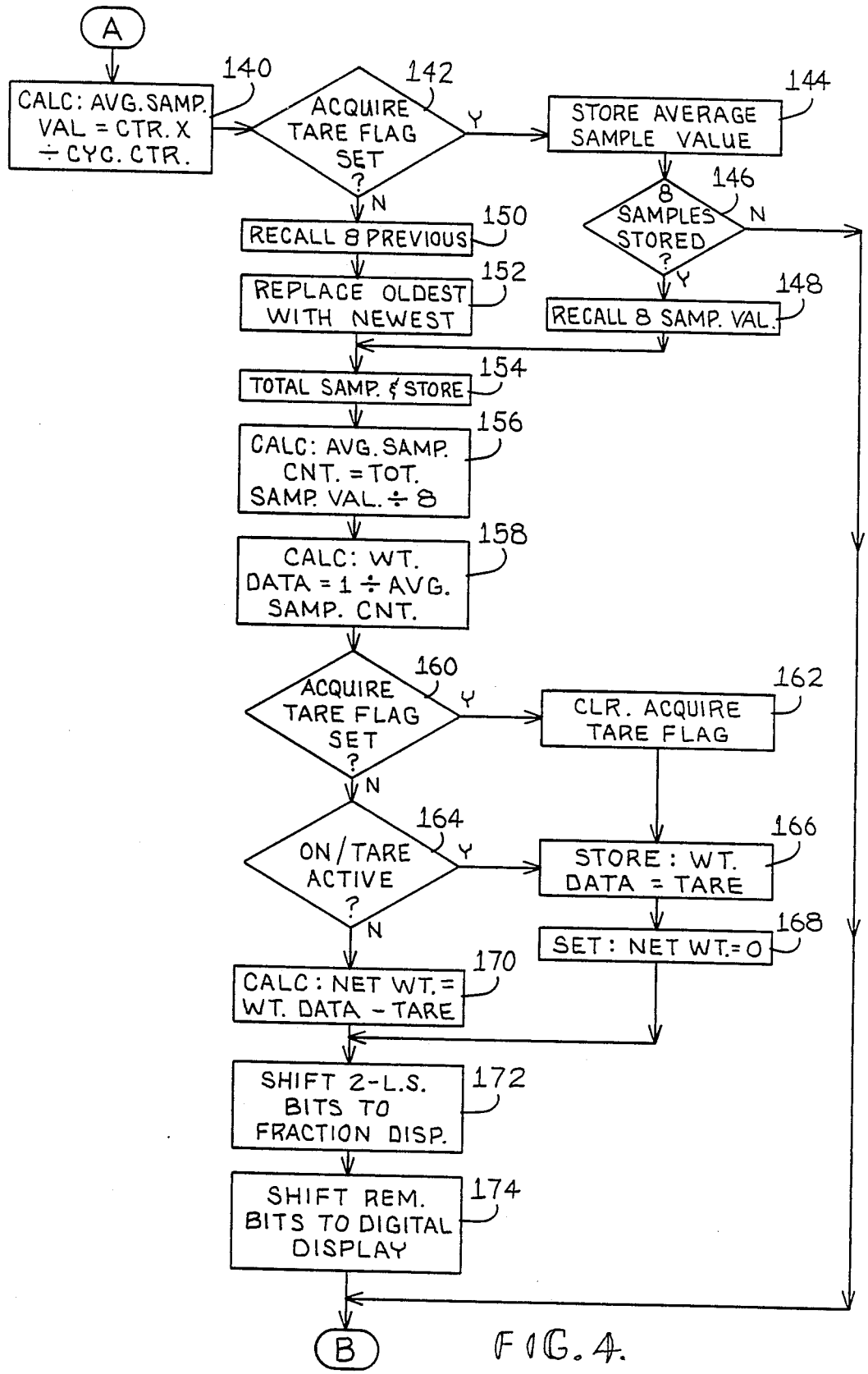
FIG. 4 is a computer program flowchart of the second part of the operating program for the weigh scale.

The operation of weigh scale 10 is best understood with reference to the operating program embodied in microcomputer 38 as illustrated in flowchart form in FIGS. 3 and 4.

Turning initially to FIG. 3, the program enters and begins operation at step 96 which initiates a conventional power up sequence when switch 18 is depressed thereby causing terminal IRPT 2 of microcomputer 38 to go low. Switch 18 also functions to redefine the tare weight of the scale during operation as will be explained further hereinbelow.

The program then moves to step 98 which sets a software "acquire tare" flag. This acquire tare flag is set until an initial tare value is placed in memory at the conclusion of the first eight sample periods.

In step 100, a "sample timer" is preset at 130 milliseconds and receipt of interrupt signals at microcomputer terminal IRPT 1 is disabled.

Figure 5:
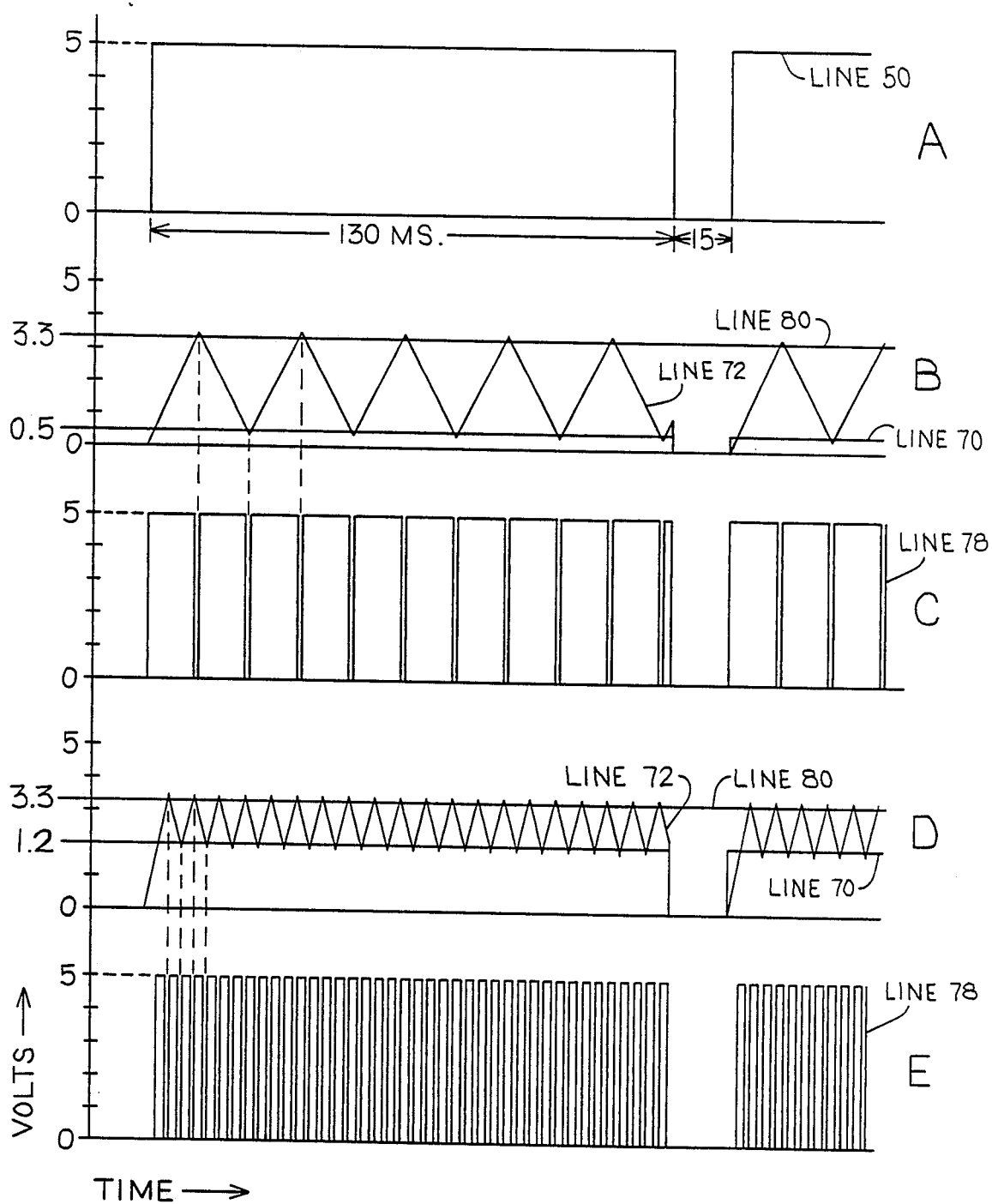
FIG. 5 is a graphical representation of signal voltages in the analog section of the weigh scale.

The program then moves to step 102 to power up analog section 36 which causes output terminals 3-7 of section P4 to go high thereby providing voltage (+5 V.D.C.) to line 50 and to also supply excitation voltage to load cell section 34. The voltage on line 50 is illustrated in FIG. 5 graph A. The voltage on line 50 will be on for about 130 milliseconds as determined by the sample timer which was preset in step 100.

The program then moves to step 104 and sets a software "first pass" flag to indicate that this is the first pass of multiple passes during the sample time.

The program then moves to step 106 to set output terminal 2 (section P4) on microcomputer 38 low (0 V.D.C.) which sets negative input terminal (pin 2) of integrator 54 low also. With pin 2 low, the output from integrator 54 via line 72 begins to "ramp up" at the fixed-slope rate as determined by the value of capacitor C6 (see FIG. 5 graph B).

With no object on platform 12, the output voltage from load cell amplifier 52 via line 70 will be about +0.5 V.D.C. as supplied to comparator 58. Initially, load cell amplifier output voltage via line 70 will be higher than the ramp voltage via line 72 and the output from comparator 58 on line 78 will be low. With the rising ramp voltage on line 72, the positive terminal input voltage to comparator 58 soon exceeds the negative terminal input and comparator 58 output via line 78 goes high (FIG. 5 Graph C).

In step 108, the program resets an internal "cycle counter" to zero. The cycle counter counts ramp cycles by incrementing at the completion of each ramp cycle.

In step 110 an internal counter, "counter X", and its associated prescaler are preset to a zero reference value. Counter X receives and counts scaled clock pulses at a scaled rate of about 500 kilohertz and is enabled whenever the input to terminal CNTR EN of microcomputer 38 is low.

The program then moves to step 112 and sets a software integrator flag.

In step 114, the program enables receipt of an interrupt signal at terminal IRPT 1 of microcomputer 38. An interrupt signal is recognized as a logic low signal on terminal IRPT 1, recalling that line 78 went logic high soon after the ramp output from integrator 54 was initiated in step 106.

The program then moves to step 116 to activate microcomputer output terminal 2 (section P4) to provide +5 V.D.C. to the negative input of integrator 54. With the input thereto at +5 V.D.C., the output from integrator 54 via line 72 begins to ramp down. The program then moves to step 118 to wait for a logic low interrupt signal at microcomputer terminal IRPT 1.

When the falling ramp integrator output via line 72 falls below the level of the load cell signal from amplifier 52, comparator 58 changes state and its output goes logic low via line 78 to terminal IRPT 1. This logic low signal is interpreted as an interrupt in step 118 and then the program then moves to step 120.

When the output from comparator 58 goes low, the output from inverter 60 goes high via line 84 to microcomputer terminal CNTR EN. This diables counter X during the time an interrupt is received. This prevents counter X from counting during this time.

In step 120 the program disables receipt of all other interrupt signals including those received at microcomputer terminal IRPT 1. The program then moves to step 122 which asks whether the software integrate flag is set. This flag was set in step 112, and the answer is yes. The program then moves to step 124 to clear the integrator flag.

In step 126, the program sets pin 2 of integrator 54 low which causes the output therefrom to ramp upwardly, reversing its previous direction. Referring to FIG. 5 Graph B, note that the ramp voltage output from integrator 54 falls slightly below the output voltage of load cell amplifier 52 before it begins to ramp upwardly again. This slight delay is due to the latency in the operating program. That is to say, there is a slight delay between the time when an interrupt signal is received in step 118 and when the ramp reverse directions as initiated in step 126. This delay causes a very narrow pulse width as illustrated in FIG. 5 Graph C of the interrupt pulse on line 78.

The program then moves to step 128 to enable receipt of an interrupt at terminal IRPT 1 on the microcomputer.

After step 128, the program loops back to step 118 to wait until another interrupt signal is received indicating the completion of another ramp.

While the program waits in step 118, the output voltage from integrator 54 continues to climb until it exceeds the reference voltage (+3.3 V.D.C) on comparator 56. When this occurs, the output from comparator 56 goes low and provides another interrupt signal to terminal IRPT 1. In this way, comparator 56 provides an interrupt signal whenever the output from integrator 54 exceeds the reference voltage. Comparator 58 provides an interrupt signal whenever integrator 54 output voltage falls below the amplified load cell voltage.

After receipt of an interrupt signal from comparator 56 at the peak of the integrator voltage, the program moves to step 120 as before and then to step 122. This time, however, the software integrator flag, which was clear in step 124, is not set and the program moves to step 130.

Step 130 asks whether the software "first pass" flag is set. The answer is yes since the flag was set in step 104. This causes the program to advance to step 132 where the "first pass" flag is cleared.

The program then returns to step 110 which presets counter X and its associated prescaler. The program then retarces the steps 110 through 130 again in the same manner as previously described. The purpose of step 130 is to cause the program and subsequent calculations to ignore the first cycle taken of a sample. This is necessary because of the need to look at only complete cycles (ramp up and ramp down) and to discard the partial cycle generated initially.

When the program returns to step 130, again the answer to the question will be no because the "first pass" flag was previously cleared in step 132. The program will then be directed to step 134.

In step 134 the cycle counter is incremented thereby by indicating that one complete cycle has been completed.

The program then moves to step 136 which asks whether the sample timer has decremented to zero, that is, whether 130 milliseconds has elapsed since line 50 went active.

If no, the program loops back to step 112 and through step 122 continuing to control integrator output voltage between the reference voltage (+3.3 V.D.C.) and the amplified load cell voltage. Thus, the program continues through a number of cycles while incrementing the cycle counter (step 134) with the completion of each ramp cycle throughout the sample period of 130 milliseconds.

After 130 milliseconds, the answer in step 136 is yes and the program moves to step 138 to power down analog section 16 and thus load cell section 34 by turning off line 50 (low at 0 V.D.C.). This power down is shown in FIG. 5 Graph A. The power down period lasts for about 15 milliseconds which is the approximate time necessary for the program to process and display the data received during the sample period.

The program then moves to step 140 (FIG. 4). In this step, the program calculates the "average sample value" as the count total on counter X divided by the number of cycles registered on the cycle counter during the 130 milliseconds sample period. With no weight present on the scale, and load cell amplifier 52 output voltage at about +0.5 V.D.C., the cycle counter registers about five ramp cycles. The average sample value as calculated in step 140 equals about 12300 for five cycles (61500 divided by 5). The 65000 count rate is determined by dividing the 8 megahertz clock by the fixed prescaler (divided by 16) and multiplying it by 0.13 seconds to arrive at the maximum count. The actual count is less because the counter X is not enabled during the entire 130 millisecond sample time because of the interrupt signals.

The program then moves to step 142 where it is determined if the acquire tare flag is set. The answer is yes since the flag was set in step 98.

Since the acquire tare flag is set, the program is directed to step 144 which causes the average sample value to be stored in memory. The program advances to step 146 where a check is made to determine if eight average sample values have been stored. If there have not been eight sample values stored, the program is directed to step 100 to repeat the sampling process which produces the next average sample value.

If, however, all eight average samples have been stored, the program is directed to step 148 which recalls all eight average sample values. The program is then directed to step 154, the purpose of which is explained hereinbelow.

Referring to step 142, if the acquire tare flag is not set, the program will be directed to step 150. Step 150 recalls all eight average sample values stored from previous samples.

Step 152 replaces the oldest average sample value recalled in step 150 with the most recent or newest value which was calculated in step 140.

Step 154 totals the eight average sample values obtained from either step 152 or 148. The program then advances to step 156 were the "average sample count" is calculated by dividing the total of the average sample values by 8. In other words, the program calculates the average sample count for eight 130 millisecond sample periods for improved accuracy and stability. This value may be distorted until eight sample periods have been completed.

In step 158, the program calculates "weight data" as the reciprocal of the average sample count rounding to five significant figures. Continuing with the previous example, the average sample count is about 12300 (as the average after eight passes), and the reciprocal is 0.000081 (1 divided by 12300). The value is rounded to the nearest five significant figures and the decimal dropped leaving the "weight data" defined as 8.

The program then moves on to step 160 which asks whether the acquire tare flag is set. The acquire tare flag was set in step 98. The answer in step 160 is yes and the program moves to step 162.

Step 162 clears the acquire tare flag and the program is sent to step 166 which is described hereinbelow.

If the acquire tare flag was not set the program would have been sent to step 164 which asks if the ON-TARE button is active (depressed). If this button is depressed, the program will be sent to step 166.

In step 166, the value for weight data calculated in step 158 is stored as the tare value. The program then moves on to step 168 to set the "net weight" to be displayed as 0 since the weight data received is assumed to be the tare value.

After step 168, the program then moves to step 172. As will explained further hereinbelow, the weight data for output to weight display 16 is in the form of two 8-bit bytes, the two least significant bits of which correspond to the fractional weight of the object on platform 12. During the first eight passes through the program, the "net weight" of the object on the platform 12 is deemed to be zero and thus the two least significant bits are also zero. Thus, the program activates fractional indicator 24 corresponding to zero fractions of an ounce. This is accomplished by activating output terminal P2-0 of microcomputer 38 which goes high at +5 V.D.C. via line 86 to fractional indicator 24 which is thereby illuminated via line 94 and resistor R15 to ground.

The program then moves to step 174 in which the remaining bits of the weight data are converted for digital display on digital weight display 20. Since the net weight is zero, the microcomputer activates digital weight display 20 to indicate two zero digits. Thus, during the taring process when no weight is present on the platform 12, digital weight display 20 presents two zeros and fractional indicator 24 is illuminated.

If, in step 164, the ON-TARE button is not active the program will be sent to step 170. Step 170 is used to calculate the net weight by subtracting the stored tare weight value from the weight data. The program is then sent to begin the process again. After eight passes, the acquire tare flag is cleared in step 162. This process takes about 1.2 seconds (145 milliseconds × 8).

On the ninth pass through the program after power up, the acquire tare flag is clear, the answer in step 160 is no and the program moves to step 164 to determine if the ON-TARE switch is pressed. If the ON-TARE switch is not pressed, the program moves to step 170 to calculate the "net weight" as the difference between the weight data determined in step 158 and tare value (8 in the example) stored in memory. Since no weight has been placed on the platform 12, both variables "weight data" and "tare" have a value of 8 and the "net weight" is zero.

The program then moves to steps 172 and 174 to again display two 0 digits on digital weight diplay 20 and to illuminate indicator 24.

When an object to be weighed is placed on platform 12, the output voltage from load cell section 34 increases and hence the output voltage from amplifier 52 also increases via line 70 the comparator 58. Assume, for example, that a weight of 28.85 ounces has been placed on platform 12. Accordingly, the voltage output via line 70 will rise to about +1.2 volts as illustrated in FIG. 5 Graph B.

With the higher voltage on pin 10 of comparator 58, the ramp voltage at pin 11 from integrator 54 needs only to fall to about +1.2 V.D.C. before the output from comparator 58 goes low to provide interrupt signal to terminal IRPT 1 of microcomputer 38. Accordingly, the ramp cycle frequency of integrator 54 output increases as illustrated in FIG. 5 Graph D. FIG. 5 Graph E illustrates the output on line 78 which represents the series of interrupt signals to terminal IRPT 1. Because of the higher frequency of interrupt signals, the cycle counter is incremented more frequently in step 134 of the program for a given sample period of 130 milliseconds.

In step 140, the higher count registered on the cycle counter produces a lower value for "average sample value". For a weight on platform 12 of about 28.85 ounces, the ramp output from integrator 54 will experience about 75 cycles (compared to about five cycles when no weight is present). Counter X produces a count of about 60975 during this sample time. Thus, for a weight of 28.85 ounces, the average sample value in step 140 equals about 813 (60975 divided by 75) compared to 12300 when no weight was present.

In step 154, the average sample value calculated in step 140 is added to the total sample values stored in memory. Step 154 also stores the new average sample value along with the previous seven average sample values in memory.

The program then calculates the average sample count by dividing the total sample value by 8. As with the tare calculation, this number is not accurate until eight sample periods have elapsed. Assuming that the average of the last eight sample periods also equals 813, then the reciprocal, as calculated in step 158 for the variable "weight data" is 0.00123 (1 divided by 813) which is rounded to five significant figures which has the effect of rounding to the nearest quarter-ounce. The decimal is dropped and the value 123 is presented as the value for "weight data".

Assuming that the acquire tare flag is not set and the tare switch is not active, the program tare value (8) stored in memory. Thus, net weight equals 115 (123−8). In the preferred embodiment, scale 10 is designed to weigh to the nearest quarter-ounce in quarter-ounce increments and a net weight of decimal 115 corresponds to 28.75 ounces (115 divided by 4).

The value for net weight, however, is handled in binary which, for 28.75 ounces corresponds to binary 0111 0011. The two least significant bits in this example correspond to decimal 3 (¾ ounces) by shifting these two least significant bits out for display on fractional weight display 22. The remaining digits of the byte are represented by binary 0111 00. In decimal, this corresponds to 28 which is the value shifted by microcomputer 38 for display in digital form on digital weight display 20.

As described above, microcomputer 38 processes the signals received from analog section 36 into a form suitable for digital weight display 20 and for fractional weight display 22. And so, for the example of 28.85 ounces, weight display 16 presents the digits 2 and 8 on digital weight display 20 and illuminates fractional weight indicator 30 for ¾ ounces as the nearest quarter ounce corresponding to 0.85 ounces.

ON-TARE switch 18 is useful for "retarding" scale 10 for increased accuracy if platform 12 accumulates food particles. By depressing switch 18, a new tare value is placed in memory. Depressing of switch 18 has the same effect as setting the acquire tare flag. Scale 10 is also conveniently provided with software to shut off display 20 after a predetermined time period with no change in display 20 in order to lengthen battery life.

Those skilled in the art will appreciate that the present invention encompasses many variations in the preferred embodiment herein described. For example, the weight units or fractional divisions provided are a matter of design choice. That is to say, the weight units could be in grams or pounds, for example, and a discrete fractional portion could be in halves, eighths, or any other division as a matter of design choice. Furthermore, the "0" fraction indicator is provided as an added convenience to ensure the operator that the weight is nearer the whole number digitally indicated than then to the next fractional increment. As an additional example, indicators other than light emitting diodes herein preferred could also be used and could include liquid crystal segments, neon lamps, and the like.

The present invention also encompasses signal processors other than the microcomputer herein preferred such as a microprocessor with associated peripheral devices. As a final example, means other than the preferred analog section 36 are within the skill of the art for providing scale signals representative of the weight of an object in a form suitable as input to a signal processor.

Having thus described the preferred embodiment of the present invention, the following is claimed as new and desired to be secured by Letters Patent:

1. In an electronic weigh scale having support means for supporting an object to be weighed thereon and signal means operably coupled with the support means for sensing the weight of the object and for producing scale signals representative thereof, an apparatus for producing a visually perceptible display of the object weight, said apparatus comprising:

signal processing means operably coupled with the signal means for receiving and processing the scale signals and in response for producing a first weight signal representative of the object weight as the highest inclusive multiple of a predetermined weight unit, and a second weight signal representative of the object weight in excess of said multiple to the nearest discrete, fractional portion from among a plurality of predetermined fractional portions of said weight unit;

first display means coupled with said signal processing means for receiving said first weight signal and in response for producing a visually perceptible representation only of said highest inclusive multiple;

second display means separate from said first display means and coupled with said signal processing means for receiving said second weight signal and in response for producing a visually perceptible representation only of said nearest fractional portion of the object weight in excess of said multiple; and said second display means including a plurality of separate discrete activatible indicators respectively corresponding to said plurality of predetermined fractional portions and including means for activating at least a selected one of said indicators corresponding to said nearest fractional portion;

means coupling said first and second display means in a visually juxtaposed and cooperative relationship for rapid determination by a user of the scale of the total object weight with the a resolution of the nearest fractional portion of said weight unit.

2. The weigh scale as set forth in claim 1, said first display means including a liquid crystal display.

3. The apparatus as set forth in claim 1, said signal processing means including a microprocessor.

4. The weigh scale as set forth in claim 3, said indicators including light-emitting diodes.

5. The weigh scale as set forth in claim 3, said plurality of indicators including a zero indicator.

6. The apparatus as set forth in claim 1, said weight unit being an ounce, said fractional portions being quarters of an ounce.

* * * * *